United States Patent [19]
Wilson et al.

[11] 4,263,243
[45] Apr. 21, 1981

[54] METHOD FOR MAKING A FLEXIBLE BEARING

[75] Inventors: Jonathan W. Wilson, Kennebunkport, Me.; Billy H. Prescott, Willard; D. Morley Cox, Logan, both of Utah

[73] Assignee: Thiokol Corporation, Newtown, Pa.

[21] Appl. No.: 36,466

[22] Filed: May 7, 1979

[51] Int. Cl.² .................... B29C 27/00; B29G 5/00
[52] U.S. Cl. ............................ 264/137; 156/245; 264/157; 264/250; 264/258; 264/261; 277/227; 308/2 R; 308/26
[58] Field of Search ........... 264/250, 257, 256, 137, 264/138, 261; 227/DIG. 6, 227; 308/135, 237 R, 238, 160, 174, 164, DIG. 8, 184, 261, 262, 347; 156/93, 242, 245

[56] References Cited
U.S. PATENT DOCUMENTS

| | | | |
|---|---|---|---|
| 2,900,182 | 8/1959 | Hinks ............................ | 308/2 R |
| 3,429,622 | 2/1969 | Lee et al. ...................... | 267/141.1 |
| 3,467,353 | 9/1969 | Peterson et al. .............. | 267/141.1 |
| 3,504,902 | 4/1970 | Irwin ............................. | 308/2 R |
| 3,504,903 | 4/1970 | Irwin ............................. | 239/265.35 |
| 3,504,904 | 4/1970 | Irwin ............................. | 239/265.35 |
| 3,519,260 | 7/1970 | Irwin ............................. | 308/26 |
| 3,696,999 | 10/1972 | Desjardins .................... | 239/265.35 |

Primary Examiner—W.E. Hoag
Attorney, Agent, or Firm—Edward E. McCullough

[57] ABSTRACT

A strong, light-weight flexible bearing, particularly suitable for use in mounting a movable thrust nozzle to a rocket case, is made by stacking reinforced plastic shims, having the forms of concentric, spherical zones, alternately with layers of elastomer and bonding them together. A protective heat and flame barrier is formed by providing an especially refractory outer edge on each shim, which extends beyond the layers of elastomer. Each shim is made by:

preparing a mold surface that forms a spherical zone of unique radius; filling a refractory cloth with a curable, liquid resin; placing segments of the cloth on the mold surface in an overlapping arrangement until the desired shim thickness is attained; preparing a second mold surface substantially parallel to the first; clamping this over the cloth segments on the first mold surface; and applying heat and pressure to the cloth segments until the resins are cured. The protective edge is formed on each shim by attaching an edging of resin-filled cloth, of especially refractory properties, to the outer edge of at least some of the segments before arranging them in the mold.

18 Claims, 7 Drawing Figures

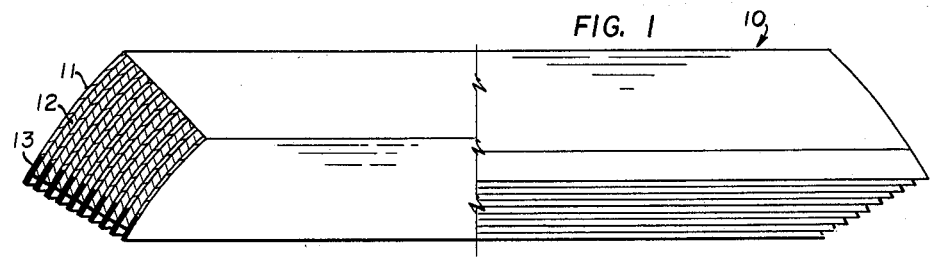
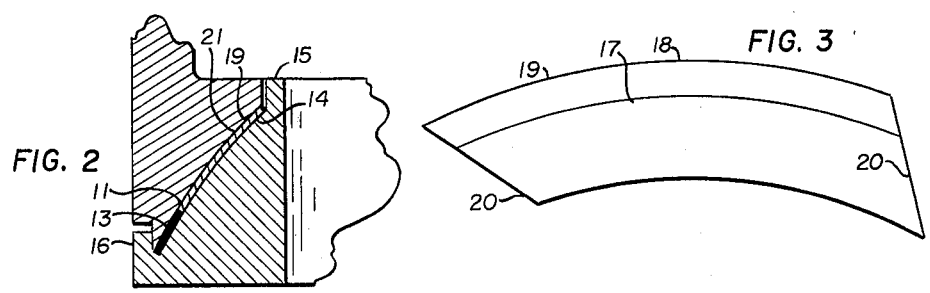
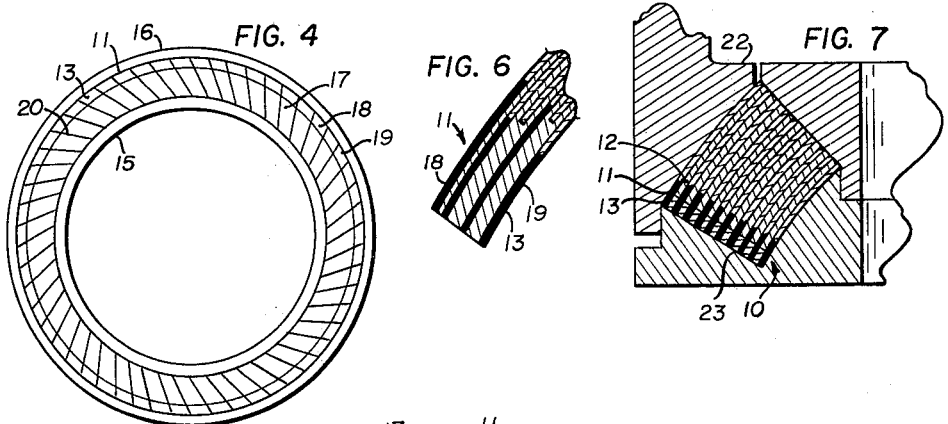
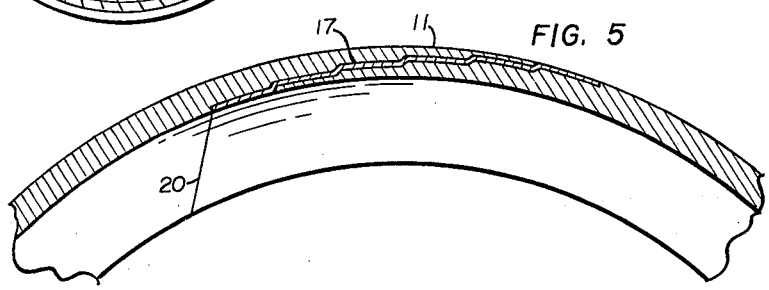

METHOD FOR MAKING A FLEXIBLE BEARING

The Government has rights in this invention pursuant to Contract No. N0003074C0100 with the U.S. Navy.

BACKGROUND OF THE INVENTION

This invention relates broadly to flexible bearings of the type constructed of rigid shims and layers of elastomer stacked alternately and bonded together. More specifically, it relates to methods for making annular, flexible bearings of this type that are used for mounting thrust nozzles to rockets.

SUMMARY OF THE INVENTION

A continuing objective in the design of rockets is to minimize the weight of the rocket motor hardware so that the range and/or payload of the rocket may be maximized. The present invention has been outstandingly successful in eliminating excess weight of hardware by producing a lighter weight, flexible bearing for mounting a movable nozzle to a rocket case; and by eliminating protective rubber boots and an annular cowl that were previously necessary for protecting the bearing from the hot, erosive, propulsive gases of the rocket.

The product of the present invention is an annular, flexible bearing, wherein the rigid shims are made of refractory cloth filled with a polymerized resin. Preferably, this cloth is made of glass fibers. The outer edge portion of each shim is preferably made of carbon cloth filled with a phenolic resin (although other refractory material may be used) and extends beyond the outer edges of the layers of elastomer to form a protective flame barrier for the bearing.

Certain features of the product of the present invention are known in the prior art. For example, U.S. Pat. No. 3,429,622 to R. E. Lee et al. teaches the basic structure of the flexible bearing for use in mounting a movable thrust nozzle to a rocket case; U. S. Pat. No. 3,519,260 to A. S. Irwin teaches the use of rigid shims that extend beyond adjacent layers of elastomer at their outer edges to provide a means for protecting the bearing from heat and flame; and U.S. Pat. No. 3,696,999 to S. P. Desjardins et al. teaches a joint, integral with a rocket thrust nozzle, having shims made of fibrous layers filled with plastic resins. However, none of these patents teach the use of shims made of resin-filled cloth in a bearing located inside a rocket. Neither do they teach methods of making such shims so that they will be sufficiently strong and refractory to survive the severe environment inside a rocket.

According to the present invention, each of the rigid shims is separated from adjacent shims by uniform layers of elastomer, and all conform to spherical surfaces about a common center. Hence, each shim differs in radius from adjacent shims by an increment of radius equal to the thickness of the layers of elastomer.

In preparing each shim, a convex mold surface is shaped to form a zone of a sphere having the unique radius of a particular shim; segments of refractory cloth, filled with a resin, are then placed on the mold surface in overlapping relationship until the desired shim thickness is obtained; a concave mold surface, parallel to the convex surface, but differing in radius therefrom by the desired thickness of the shim, is placed over the layers of cloth; and heat and pressure are applied until the resin is fully cured. Edgings of a more refractory cloth, filled with a refractory resin, are attached to the outer edges of at least some of the cloth segments prior to the placement thereon of the second mold surface. This provides the shim with a protective outer edge that extends beyond the elastomer in the bearing.

Objects of the invention are to provide a flexible bearing, for mounting a movable thrust nozzle to a rocket, that will afford a lighter-weight, lower cost, simpler, and more reliable system for rockets. Another object of the invention is to provide a process that will produce a rigid shim for such a bearing that is sufficiently strong and refractory to survive the severe environment inside a rocket motor. Other objects and advantages of the invention may be noted as the following, detailed description is read with reference to the accompanying drawings. The same numbers refer to the same parts throughout the disclosure.

BRIEF DESCRIPTION OF THE DRAWINGS

In the drawings:

FIG. 1 is a partially sectioned, side elevation of the completed bearing;

FIG. 2 is a half-sectioned view of the shim in a mold;

FIG. 3 is a top view of a cloth segment;

FIG. 4 is a view of the cloth segments arranged on the convex mold surface;

FIG. 5 is a cross section of a typical shim, with exaggerated thickness, showing only one cloth segment, for clarity;

FIG. 6 is a section of the edge of a single shim; and

FIG. 7 is a fragmentary section of a mold in which the bearing is made, to show the spacers between the shims.

DESCRIPTION OF THE PREFERRED EMBODIMENTS

As shown in FIG. 1, the product of the present invention is an annular, flexible bearing 10 for mounting a movable thrust nozzle to a rocket case. The bearing 10 is constructed of rigid shims 11 alternately stacked with layers 12 of elastomer. A protective outer edge 13 on each shim 11 extends beyond adjacent layers 12 of elastomer to form a barrier to heat and flame.

An annular, convex mold surface 14 is made to conform to a zone of a spherical surface having the radius of a specific shim 11. It is edged with inner and outer ridges 15 and 16, respectively, to contain material to form a shim 11 (see FIG. 2). Glass fiber cloth is then filled with an epoxy resin that is cured sufficiently for convenient handling. The cloth is then cut into arcuate segments 17 of about 40 degrees in length (FIG. 3). An edging 18 of carbon cloth filled with a partially cured phenolic resin is sewn to the outer edge of the glass cloth segment 17, so that the composite segment 19 of glass cloth and carbon cloth is of the same width as the convex mold surface 14.

The composite segments 19 are then arranged on the convex mold surface 14 in an overlapping relationship at about 6.66 degree intervals so that one end portion of each segment 19 forms 6.66 degree area of the convex surface of a shim 11 and its other end portion forms 6.66 degree area of the concave surface thereof (see FIGS. 4 and 5).

The relative widths of the glass cloth segments 17 and the carbon cloth edges 18 are varied to produce the staggered arrangement shown in FIG. 6. This provides a strong juncture of the glass cloth portion of the shim 11 with its protective carbon edging 13. For the same reason, the ends 20 of the segments are not cut along radial lines from the center of the shim 11, but at considerable angles thereto. However, the wrap and fill threads of the segment 19 are oriented substantially radially and circumferentially relative to the shim 11 to maximize the strength thereof. Although felted or random fiber cloth may be used in some applications, woven cloth is preferred in the present embodiment.

It is to be understood that the dimensions given in the above paragraphs are illustrative only. The lengths of the segments 18, the number of layers in each shim 11, etc., will vary according to the type of bearing 10 being made.

A concave mold surface 21 is made to be parallel with the convex mold surface 14, but to have a radius differing from that of the mold surface 14 by the desired thickness of the resulting shim 11. When the segments 19 have been arranged on the convex mold surface 14, the concave mold is closed thereon, and heat and pressure of the order of 300-325 degrees F. and 1200 psi, are applied for 75-120 minutes until the resins are cured.

In a preferred embodiment, the mold surfaces 14 and 21 are coated with a release agent, such as Teflon, to provide releasing surfaces that facilitate removal of the finished shim 11.

The resulting shims 11 are then removed, stacked alternately with annular, layers 12 of elastomer in a second mold 22, where heat and pressure are again applied until the elastomer has been vulcanized and securely bonded to adjacent shims 11. This second mold contains spacers 23 that insure uniform thicknesses of the elastomeric layers 12 in the finished bearing 10. This effect is further promoted by calendering, pressing, extruding, or otherwise insuring that the elastomeric layers 12 are flat and smooth before they are installed between the shims 11.

An invention has been described that provides an advance in the art of flexible bearings. Although the preferred embodiment has been described specifically with regard to details, it is understood that many details may be altered without departing from the scope of the invention, as it is defined in the following claims.

The invention claimed is:

1. The method for making flexible bearings, comprising:
    filling refractory cloth with a curable liquid resin;
    dividing the cloth into segments;
    laying the segments onto a releasing mold surface in an annular configuration so that they overlap one another only to a limited extent;
    completing the mold by placing a second, releasing mold surface over the resin-filled segments;
    forming a rigid shim by subjecting the resin-filled cloth to pressure while curing the resin;
    interleaving layers of a curable elastomer with a plurality of said rigid shims; and
    subjecting the resulting bearing to heat and pressure while curing the elastomer.

2. The method of claim 1 wherein the resin is a thermosetting resin and the resin-filled, cloth segments are subjected to heat as well as pressure to promote curing.

3. The method of claim 1 wherein the resin is an epoxy resin.

4. The method of claim 1 wherein the cloth is made of glass fibers.

5. The method of claim 1 wherein the shim is an annulus, the cloth is woven, and warp and fill fibers of each cloth segment are oriented substantially radially and circumferentially to maximize the strength of the shim.

6. The method of claim 5 wherein each cloth segment has two parallel edges, one defining a portion of the inner edge of the completed annulus and the other defining a portion of the outer edge thereof, and wherein a plurality of the segments overlap one another so that one end of each segment forms a portion of one surface of the shim while the other end thereof forms a portion of the opposite surface of the shim.

7. The method of claim 5 wherein the mold surfaces constitute portions of spheres.

8. The method of claim 5 further including filling edgings of carbon cloth with a resin and attaching them to the outer edges of at least some of the cloth segments before arranging them on the mold surface.

9. The method of claim 8 wherein the refractory resin in the carbon cloth is a phenolic resin.

10. The method of claim 8 wherein each carbon cloth edging is of a different width and is attached to its cloth segment by sewing, to create a gradual increase in refractory properties from glass portion of the shim to its outer edge.

11. The method for making an annular, flexible bearing for mounting a movable thrust nozzle to a rocket case comprising:
    preparing a plurality of releasing mold surfaces, each forming a unique zone of a sphere differing from adjacent zones by a constant increment of radius;
    arranging segments of refractory cloth filled with a partially cured resin in overlapping relationship on each mold surface so that each spherical zone is filled therewith;
    placing a second mold surface over the cloth segments, each second mold surface being parallel to its corresponding first mold surface but differing therefrom in radius by the desired thickness of the resulting shim;
    subjecting the cloth segments to elevated heat and pressure until the resin is cured;
    arranging the resulting shims in a mold, alternately stacked with layers of elastomer; and
    applying heat and pressure to the assembly of shims and elastomer until the elastomer is vulcanized and bonded to the shims.

12. The method of claim 11 wherein each cloth segment has two parallel edges, one partially defining the inner edge of the annulus and the other partially defining the outer edge thereof, and wherein a plurality of the segments overlap one another to provide a plural-segment thickness for each shim, and one end portion of each segment forms a portion of one surface of a shim while its other end portion forms a portion of the opposite surface of the shim.

13. The method of claim 11 wherein the cloth segments are made of woven glass fibers.

14. The method of claim 13 wherein the warp and fill fibers are oriented substantially radially and circumferentially to maximize the strength of the resulting shims.

15. The method of claim 11 further including attaching edgings of woven, carbon cloth filled with a partially cured resin to the outer edges of at least some of the cloth segments before they are arranged on the mold surfaces.

16. The method of claim 15 wherein the resin is a phenolic resin.

17. The method of claim 15 wherein each carbon cloth edging is of a different width and is fastened to a corresponding cloth segment by sewing, to create a gradual increase in refractory properties from the inner portion of each shim to its outer edge.

18. The method of claim 15 wherein the shims are larger in diameter than are the layers of elastomer, so that at least a portion of the edgings of the shims extend beyond the elastomer.

* * * * *